US012694619B2

(12) United States Patent
Medin et al.

(10) Patent No.: US 12,694,619 B2
(45) Date of Patent: Jul. 28, 2026

(54) GENERATION OF REPRESENTATIONS OF THREE-DIMENSIONAL SUBJECTS

(71) Applicant: GOOGLE LLC, Mountain View, CA (US)

(72) Inventors: Safa Can Medin, Cambridge, MA (US); Gengyan Li, Volketswil (CH); Ruofei Du, San Francisco, CA (US); Stephan Joachim Garbin, London (GB); Philip Lindsley Davidson, Arlington, MA (US); Thabo Beeler, Egg (CH); Abhimitra Meka, Redwood City, CA (US)

(73) Assignee: Google LLC, Mountain View, CA (US)

( * ) Notice: Subject to any disclaimer, the term of this patent is extended or adjusted under 35 U.S.C. 154(b) by 153 days.

(21) Appl. No.: 18/639,047

(22) Filed: Apr. 18, 2024

(65) Prior Publication Data

US 2025/0329112 A1 Oct. 23, 2025

(51) Int. Cl.
| | |
|---|---|
| *G06T 17/20* | (2006.01) |
| *G06T 15/04* | (2011.01) |
| *G06T 15/20* | (2011.01) |
| *G06T 15/50* | (2011.01) |

(52) U.S. Cl.
CPC .............. *G06T 17/20* (2013.01); *G06T 15/04* (2013.01); *G06T 15/20* (2013.01); *G06T 15/506* (2013.01)

(58) Field of Classification Search
CPC ......... G06T 17/20; G06T 15/04; G06T 15/20; G06T 15/506

USPC ......................................................... 345/426
See application file for complete search history.

(56) References Cited

U.S. PATENT DOCUMENTS

| | | | | |
|---|---|---|---|---|
| 2005/0024377 A1* | 2/2005 | Munshi | .................. | G06T 15/04 |
| | | | | 345/582 |
| 2010/0049488 A1* | 2/2010 | Benitez | ................. | G06T 15/506 |
| | | | | 345/426 |
| 2020/0082595 A1* | 3/2020 | Okada | ................... | G06T 15/506 |
| 2022/0198738 A1 | 6/2022 | Xu et al. | | |
| 2023/0360327 A1* | 11/2023 | Bi | ........................... | G06T 17/20 |

OTHER PUBLICATIONS

Xu, et al., "Efficient 3D Articulated Human Generation with Layered Surface Volumes", arXiv:2307.05462v1, Jul. 11, 2023, 15 pages.
Rocco, et al., "Real-Time Volumetric Rendering of Dynamic Humans", arXiv:2303.11898v1, Mar. 21, 2023, 13 pages.

* cited by examiner

*Primary Examiner* — Hai Tao Sun
(74) *Attorney, Agent, or Firm* — Brake Hughes Bellermann LLP

(57) ABSTRACT

According to an aspect, a method includes generating at least one surface for a subject based on image data, the image data comprising a first image from a first perspective and a second image from a second perspective. The method further includes identifying a distribution of light intensity over the at least one surface and identifying a view independent feature based on the distribution of light intensity. The method also provides generating a texture map for a sequence of images based on the view independent feature.

20 Claims, 7 Drawing Sheets

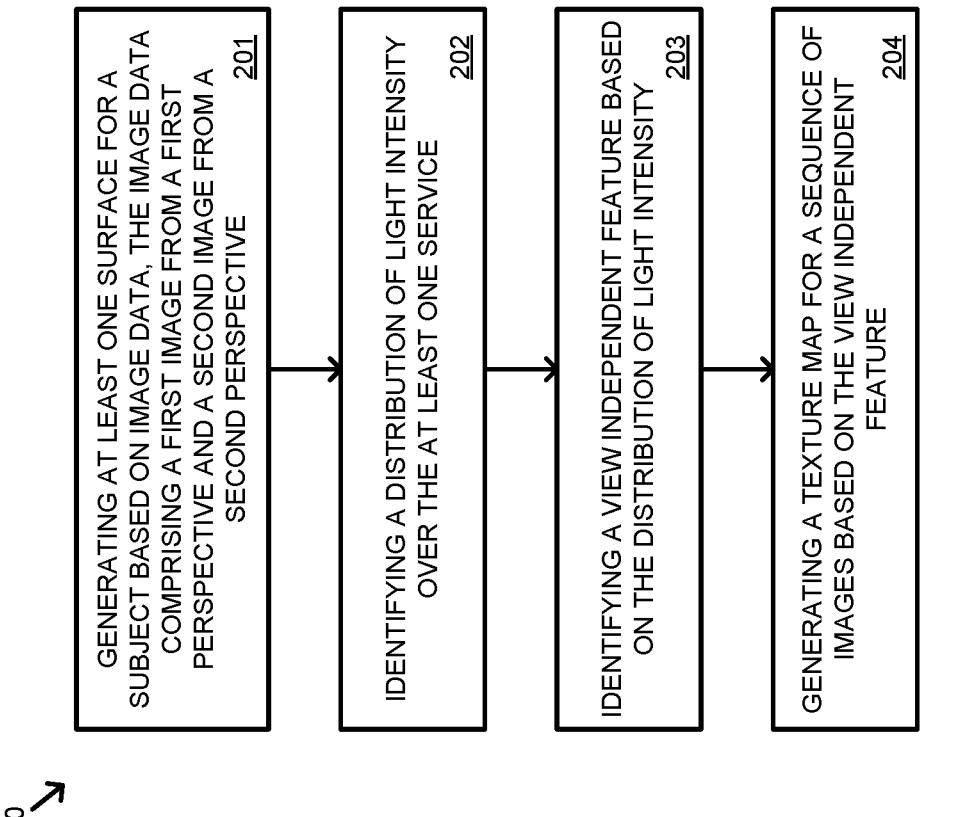

200

GENERATING AT LEAST ONE SURFACE FOR A SUBJECT BASED ON IMAGE DATA, THE IMAGE DATA COMPRISING A FIRST IMAGE FROM A FIRST PERSPECTIVE AND A SECOND IMAGE FROM A SECOND PERSPECTIVE     201

IDENTIFYING A DISTRIBUTION OF LIGHT INTENSITY OVER THE AT LEAST ONE SERVICE     202

IDENTIFYING A VIEW INDEPENDENT FEATURE BASED ON THE DISTRIBUTION OF LIGHT INTENSITY     203

GENERATING A TEXTURE MAP FOR A SEQUENCE OF IMAGES BASED ON THE VIEW INDEPENDENT FEATURE     204

FIG. 2

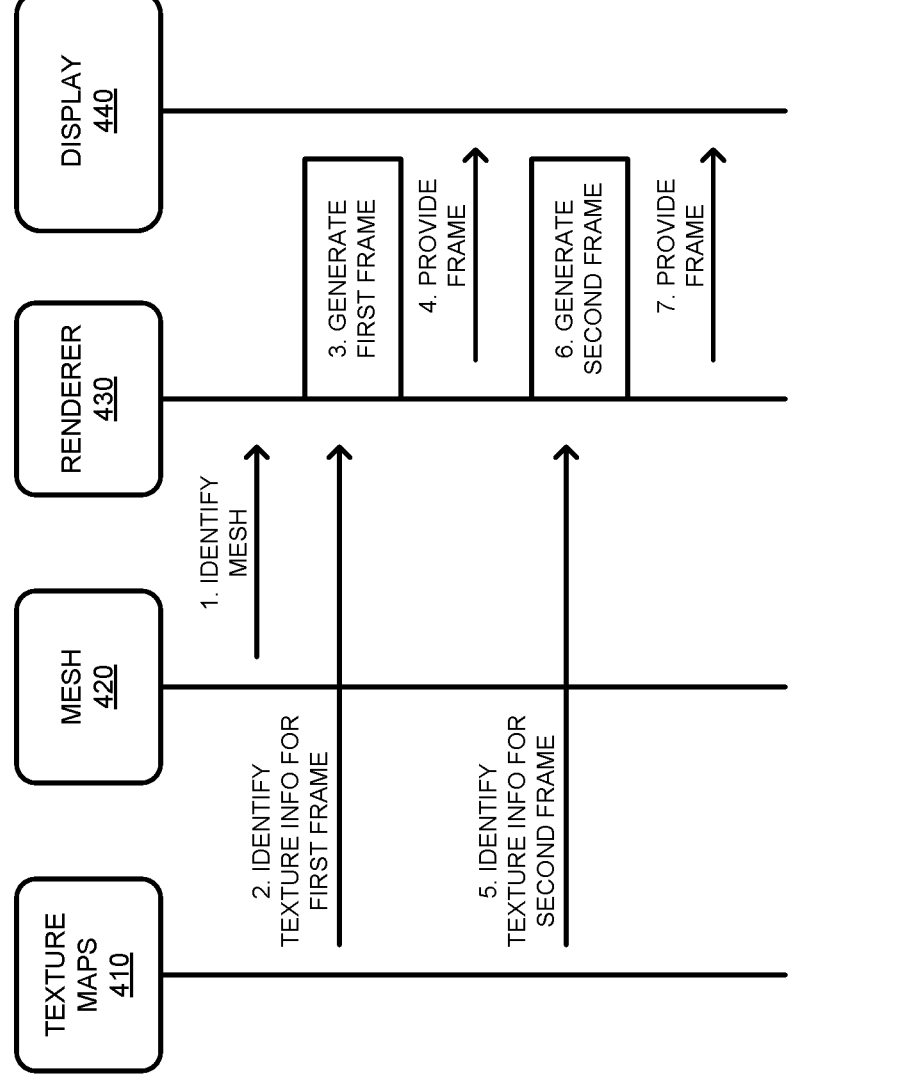
FIG. 4

GENERATION OF REPRESENTATIONS OF THREE-DIMENSIONAL SUBJECTS

BACKGROUND

Performance capture and rendering of human faces are critical technologies for media content generation, immersive AR/VR communication and telepresence, among other technical areas. The traditional mesh-based representations encounter significant challenges in accurately modeling fine-scale detailed geometry and complex appearance of items like hair and skin. Further, while recent advances exist in the field of volumetric representations, the volumetric models suffer from efficiency problems due to large runtime memory requirements and computational resources to sample the scenic volume. Therefore, difficulties arise in providing memory-efficient and high-quality renderings of complex 3D scenes, such as human faces.

SUMMARY

This disclosure relates to systems and methods that generate multilayer meshes and texture maps to render three-dimensional representations of subjects. In one example, a computing device obtains images from different perspectives associated with a subject. From the images, the system generates surfaces that are used to represent the subject as part of a 3D model. After the surfaces are generated, which may be part of one or more manifolds in some examples, the computing device identifies distribution of light over the surfaces and separates the distribution into view independent features and view dependent features. The computing device then generates texture maps as a sequence of images based on the view independent features. When a request is made for the performance of the subject, the performance is rendered using a layered mesh generated from the surfaces and the texture maps for the subject.

In some aspects, the techniques described herein relate to a method including generating at least one surface for a subject based on image data, the image data comprising a first image from a first perspective and a second image from a second perspective. The method further includes identifying a distribution of light intensity over the at least one surface and identifying a view independent feature based on the distribution of light intensity. The method also provides generating a texture map for a sequence of images based on the view independent feature.

In some aspects, a computer-readable storage medium storing program instructions that, when executed by at least one processor, cause the at least one processor to execute operations. The operations include generating at least one surface for a subject based on image data, the image data comprising a first image from a first perspective and a second image from a second perspective. The operations further include identifying a distribution of light intensity over the at least one surface and identifying a view independent feature based on the distribution of light intensity. The operations further provide generating a texture map for a sequence of images based on the view independent feature.

In some aspects, an apparatus includes at least one processor and a non-transitory computer-readable storage medium storing program instructions that cause the at least one processor to generate at least one surface for a subject based on image data, the image data comprising a first image from a first perspective and a second image from a second perspective. The program instructions further cause the at least one processor to identify a distribution of light intensity over the at least one surface and identify a view independent feature based on the distribution of light intensity. The program instructions also cause the at least one processor to generate a texture map for a sequence of images based on the view independent feature.

The details of one or more implementations are set forth in the accompanying drawings and the description below. Other features will be apparent from the description and drawings, and from the claims.

BRIEF DESCRIPTION OF THE DRAWINGS

FIG. 2 illustrates an example operation of a computing device to generate a mesh and texture map associated with a subject.

FIG. 4 illustrates a timing diagram of rendering a performance of a subject at a computing device.

DETAILED DESCRIPTION

Figure 1:
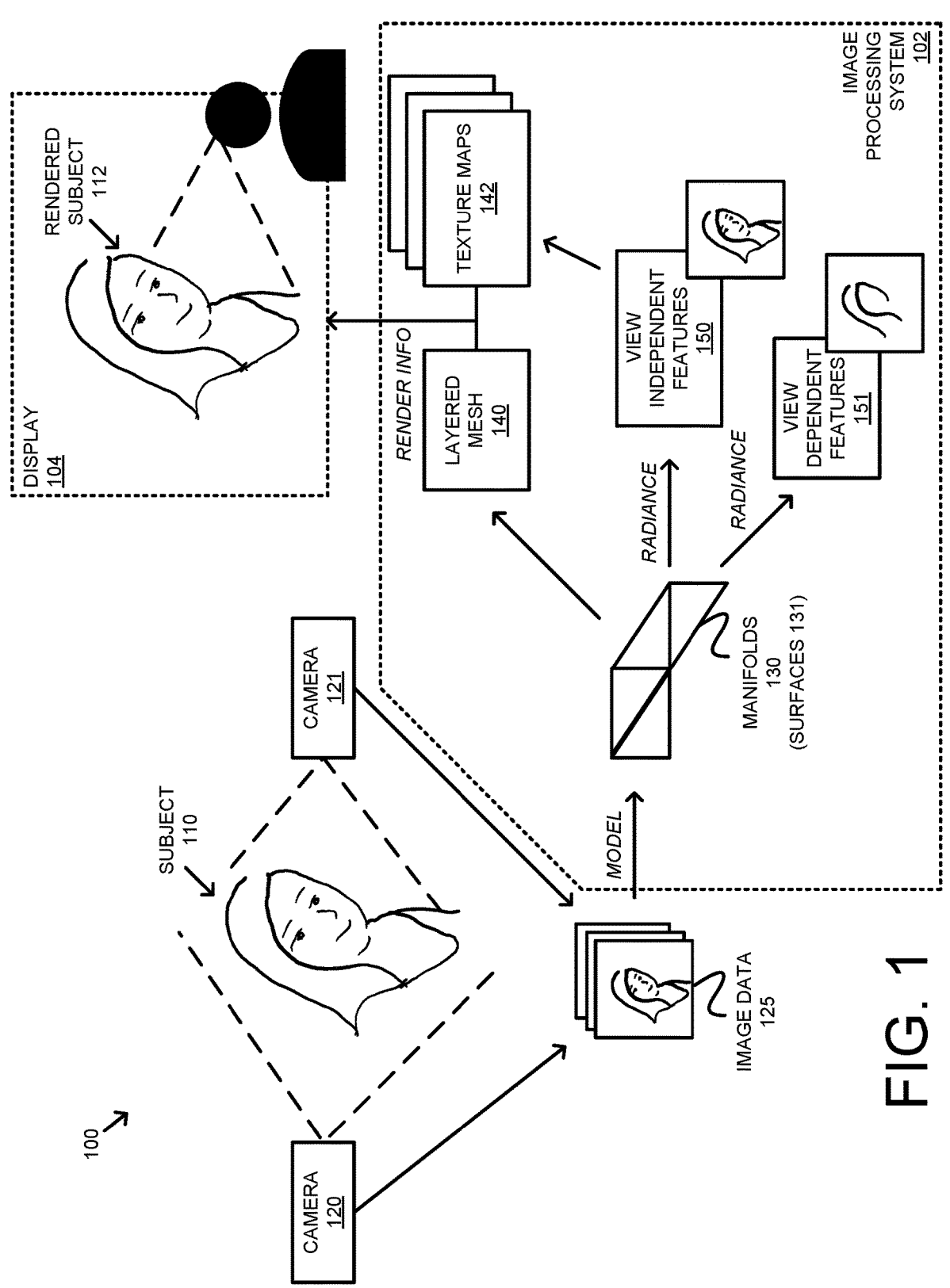
FIG. 1 illustrates an example of processing images of a subject from multiple perspectives to generate a mesh and a texture map of the subject.

Video calls offer the advantage of real-time communication, fostering a sense of presence and immediacy, while three-dimensional (3D) video enhances immersion and depth perception, creating more engaging and interactive experiences. By combining 3D representations of video callers or video presenters, a receiving user can be more engaged or immersed in the information provided by the presenter. However, at least one technical problem is the difficulty in creating data that can efficiently be used to generate a 3D representation of a presenter without using specialized processing circuitry.

As a technical solution, a device can generate a 3D representation of a presentation that can efficiently and effectively be displayed by a destination device on commodity hardware (e.g., a mobile phone or a typical laptop device). For example, a first user at a first device can provide a presentation that is captured by cameras at the first device (e.g., a mobile phone, virtual reality device). The first device can process video of the presentation from the cameras and generate data that supports a 3D render of the presentation at a second device (e.g., a laptop device). The data can then be distributed to the second device that renders a 3D representation of the presentation using the generated data. At least one technical effect is that the second device with commodity hardware can effectively produce a 3D rendering of a captured presentation, providing the user of the second device with an immersive experience.

At least one technical solution is related to systems and methods to generate a layered mesh and a texture map based on image data of a subject. In at least one implementation, a computing device can be configured to obtain image data associated with a performance by a subject. The image data may include images or video from various angles of the subject. For example, the image data may correspond to strategically positioned cameras around a human face to capture images from different viewpoints (e.g., different viewpoints simultaneously).

From the image data, and as at least one technical solution, the computing device can be configured to process the image data to generate information that may be used to render a 3D representation of the performance by the subject. In at least one example, the information for the render includes data that can be rendered using commodity hardware. For example, in a video conference, a presentation of a subject may be captured and processed to create the information for the 3D render. In response to the information being generated, the information is communicated to a computing device (augmented reality (AR)/virtual reality (VR) device, computer, tablet, and the like) and is rendered using the provided information.

In one example of the technical solution, to generate the information for the render from the image data, the computing device may apply a model that identifies surfaces associated with the subject of the performance. In some implementations, the surfaces correspond to manifolds. A manifold can refer to a surface that exists within a two-dimensional (2D) space. The surface can be represented by a mesh composed of vertices, edges, and faces, which collectively describe its geometric properties. In the context of computer graphics, 2D manifolds may be encountered in the form of images, textures, or planar surfaces that are embedded within a 3D scene.

In addition to identifying the surfaces associated with the subject, at least one technical solution can include a computing device configured to further identify a distribution of light intensity over the surfaces (which can be included in at least one manifold). The distribution of light intensity may be included as part of a radiance value, wherein radiance refers to the amount of light that is emitted, reflected, or transmitted from a surface in all directions. Radiance considers (e.g., can include) both the intensity and directionality of light across the surface, making it a comprehensive measure of light energy. Radiance accounts for factors such as surface reflectance properties, light sources, and the geometry of the scene. Radiance is often used in rendering to calculate the color and brightness for an image. For example, radiance may be used to define the color and brightness associated with the skin tone of a subject.

In some implementations, the surfaces and radiance information are determined via models, such as neural networks. The surfaces and radiance information use a set of 2D images that predict the 3D information for the subject. In predicting the surfaces and light intensity for the different surfaces, the computing device adjusts parameters to minimize the difference between the captured images (i.e., from the different camera perspectives) and the information portrayed using the surfaces and light information. In the example of a model or neural network, a computing device may use interconnected nodes, called neurons or units, organized into layers. Information is passed through the network from the input layer, where data is introduced, through hidden layers, which perform computations, to the output layer, which produces the network's prediction or output. Each connection between neurons is associated with a weight, which determines the strength of the connection. During the modeling operations for the subject, these weights are adjusted based on the network's performance on a labeled dataset (i.e., the received images), allowing it to learn patterns and relationships within the data. Thus, surfaces and the distribution of light intensity (as part of radiance) may be adjusted to better reflect the truth information from the 2D images using the updated model.

After the surfaces and the light intensity information are determined for the subject, the computing device further separates view independent features from the view dependent features based on the light intensity information. The view independent features include light information that is visible independent of the view angle associated with the 3D model, while view dependent features include light information for unique viewing angles (e.g., left side of a subject's face and right side of the subject's face). The view independent features may be identified by recognizing features (i.e., distribution of light intensity) on the model that do not change based on the perspective of the model.

In some implementations, the system may map the light intensity information as part of the radiance in the UV space from the surfaces. The UV (horizontal and vertical) space or UV plane refers to a 2D coordinate system that is mapped onto the surface of a 3D subject. This UV mapping allows textures to be applied to the subject's surface by specifying how points on the 3D surface correspond to points on a 2D texture image. The UV coordinates (u, v) represent the horizontal and vertical positions on this plane, respectively, determining how the texture is wrapped around or applied to the model of the subject (e.g., presenter's face). In one example, the UV space mapping may separate features that are view dependent from features that are view independent. In at least one implementation, to convert radiance from the surfaces to the UV space, the device may project the radiance samples from the identified surfaces onto the UV parameterization of the surface. This involves transforming the radiance values from the surface's coordinate system to the UV space using appropriate geometric and texture mapping techniques. Features (or light intensity information) that appear across the different views may be classified as view independent, while features (or light intensity information) that appear in a subset of the surface views will be classified as view dependent.

Once the view independent features are identified, the computing device may generate a texture map for a sequence of images based on the view independent features associated with the subject. In some implementations, the texture map corresponds to a set of texture maps arranged as a movie for the performance of the subject. For example, the texture maps comprise texture information associated with a person's face during the performance. Texture maps are 2D images applied to the surfaces of 3D models to enhance their visual appearance. These maps may contain pixel-based information that indicate surface properties such as color, reflectivity, and roughness. By mapping these textures onto the corresponding surfaces of 3D models, intricate details may be displayed like skin pores, fabric patterns, or weathering effects. In some implementations, each texture map includes color information (red, green, blue) as well as an additional alpha channel that represents transparency and opacity. Together the texture map may be referred to as a red-green-blue-alpha (RGBA) texture map. The texture maps may include the view independent features identified from the surfaces, which remedy a technical problem associated with rendering view dependent features. Here, as a technical solution, the texture maps include view independent features that are capable of being rendered by commodity hardware.

In some examples, in addition to generating texture maps associated with the subject, the computing device further generates a layered mesh from the surfaces created for the subject. A layered mesh is a hierarchical structure comprising multiple interconnected layers, each representing distinct aspects of a 3D model such as geometry, texture, and material properties. These layers allow for flexible and efficient manipulation of different components of the model, facilitating tasks like texture mapping, animation, and rendering. In the example of facial subjects, a layered mesh may refer to a multi-level representation of facial anatomy, including skin, muscles, and bones, enabling realistic rendering and animation of facial expressions. These layers allow for detailed manipulation and simulation of facial movements and features.

Once the layered mesh and texture maps are generated, the layered mesh and texture maps may be distributed for rendering on end devices. The end devices may include smartphones, computers, tablets, extended reality (XR) devices, or some other device. In some examples, multiple layered meshes and texture maps can be generated to support hardware requirements at different devices. For example, a first layered mesh and texture map can support a first device, while a second layered mesh and texture map can support a second device.

Various embodiments of the present technology provide for a wide range of technical effects, advantages, and/or technical solutions for computing systems and components. For example, various implementations may include one or more of the following technical effects, advantages, and/or improvements: 1) non-routine and unconventional use of multi-perspective image data to generate layered meshes and texture maps; and 2) non-routine and unconventional operations to model surfaces and light information associated with a subject.

FIG. 1 illustrates an example 100 of processing images of a subject from multiple perspectives to generate a mesh and a texture map of the subject. Example 100 permits image data 125 from cameras 120-121 to be processed using image processing system 102. Image data 125 may correspond to a speech recording, a recording for a video conference, or some other desired performance. Image processing system 102 processes image data 125 to generate render information that permits (e.g., enables) commodity hardware (AR/VR device, computer, tablet, and the like) to render a 3D representation of the performance. Once processed using image processing system 102, render information may be communicated to the commodity hardware that renders rendered subject 112 on display 104.

As an example, a video caller at a first device can capture a speech for a user at a second device. The first device determines data to create a 3D representation of the captured speech and communicates the data to the second device. Once received, the second device can use the data to efficiently generate a 3D representation of the speech.

For further demonstration of the operations in example 100, example 100 includes subject 110, cameras 120-121, image data 125, manifolds 130 with surfaces 132, view independent features 150, view dependent features 151, layered mesh 140, texture maps 142, and rendered subject 112. Although demonstrated with two cameras, a system may use any number of cameras to capture the image data associated with subject 110.

In example 100, cameras 120-121 capture image data 125 of subject 110. Image data 125 may be representative of 3D video capture that uses multiple cameras that record a performance of subject 110 from different viewpoints. Cameras 120-121 capture synchronized footage that indicates depth information, allowing for the reconstruction of a 3D representation of subject 112. After image data 125 is captured, a computing device, such as a server or desktop computer, generates manifolds 130 with surfaces 131 using a model. A manifold includes at least one surface. In 3D modeling of subject 110, manifolds represent the continuous, smoothly connected surfaces 131 that make up the geometric structure of subject 110. These manifolds define the topology of the face model, ensuring that the surface is free from self-intersections, holes, or other irregularities. In some implementations, manifolds 130 may be compared to image data 125 to ensure that manifolds 130 accurately represent subject 110. These include reflecting movement of the facial muscle, mouth movement, or some other information in association with subject 110.

Once manifolds 130 are generated, the computing device identifies view independent features 150 and view dependent features 151 from manifolds 130 and the radiance over manifolds 130. Radiance in 3D modeling refers to the amount of light energy emitted, reflected, or transmitted by a surface. Radiance is an attribute used in rendering algorithms to determine the brightness and color of surfaces, considering factors such as material properties, lighting conditions, and viewing angles to simulate realistic illumination. In some examples, the view independent features 150 and the view dependent features 151 correspond to the density of light intensity, which is a contributor to the radiance. Additionally, because radiance is identified over the manifolds, the radiance (including the density of light intensity) is inherently identified over the surfaces of the manifolds. Specifically, a manifold includes a surface, and the radiance is measured over the defined surface of the manifold.

In some implementations, view independent features 150 and view dependent features 151 are identified using spherical mapping of the manifolds from the 3D space to the UV space. Spherical mapping from 3D space to UV space involves projecting the surface of a 3D object (i.e., subject 110) onto a 2D plane in a way that simulates wrapping a texture around a sphere onto a flat surface. In this process, each point on the 3D surface is associated with a corresponding point in the UV space, determining how a texture is applied to the representation of the subject. In some examples, the mapping is done by projecting rays from a virtual camera positioned at the center of the sphere outward onto the surface, capturing the relationship between points on the 3D object representation and their corresponding locations in the UV space. Here, the mapping corresponds to the face and head of subject 110. In separating view independent features 150 and view dependent features 151, the computing device decomposes the radiance information into features that are view dependent (i.e., change with the perspective of the camera) and view independent that do not change with perspective of the camera. By separating the features, the computing device provides a technical solution that only requires the view independent features, permitting more efficient rendering of the model. Once view independent features 150 are identified, the computing device uses view independent features 150 to generate texture maps 142. Texture maps 142 are assembled as a movie or a sequence of images that permit rendering of rendered subject 112. Each texture map of texture maps 142 is a 2D image that can be applied to the surface of a 3D model to convey visual detail such as color, patterns, and surface characteristics.

In addition to generating texture maps 142, the computing device further generates layered mesh 140 from manifolds 130. A layered mesh refers to a technique where one or more mesh surfaces are stacked on top of each other to create complex and detailed models. Each layer represents various aspects of the object, such as texture, lighting, or geometry, allowing for more realistic and customizable rendering in computer graphics applications. In generating a layered mesh from manifolds, the computing device may create a series of interconnected surfaces that approximate the underlying geometric structure of the object. Manifold surfaces, which represent smooth and continuous geometric shapes without self-intersections, serve as the foundation for this mesh generation. By discretizing these surfaces into a series of smaller elements or patches, such as triangles or quadrilaterals, and arranging them in layers, a layered mesh is constructed. This approach ensures that the mesh maintains topological consistency with the original manifold while enabling the representation of intricate details and features. These details may include facial features of a subject in some examples, such as hair, skin, or other types of features.

When a request is received to render the performance of subject 110, a computing device is provided with layered mesh 140 and texture maps 142. The device renders the performance using the layered mesh 140 with texture maps 142 overlaid as a movie or sequence of images on layered mesh 140.

Although demonstrated in the example of FIG. 1 as generating a single layered mesh and set of texture maps, a computing device may generate multiple meshes and texture maps to support different rendering devices. As an example, a first mesh and first texture maps may be generated to support a first device, while a second mesh and second texture maps may be generated to support a second device. Each of the meshes and texture maps may provide a different level of complexity, permitting different rendering complexity based on the computing resources at the destination device (e.g., graphics processing, memory, and the like).

FIG. 2 illustrates an example operation 200 of a computing device to generate a mesh and texture map associated with a subject. The steps of operation 200 are referenced parenthetically in the paragraphs that follow with systems and elements of example 100 from FIG. 1. Operation 200 can be performed using a desktop computer, laptop computer, or some other computing device.

Operation 200 includes generating at least one surface for a subject based on image data, the image data comprising a first image from a first perspective and a second image from a second perspective (201). In some implementations, the surface corresponds to a manifold. A manifold refers to a surface or geometry that is smoothly connected without any creases, self-intersections, or holes. It is a concept used in computer graphics to ensure that the surfaces of 3D models are well-defined and suitable for rendering. Manifold surfaces are commonly represented using mathematical representations such as triangle meshes or parametric surfaces. In some examples, multiple manifolds are generated using a model that defines the shapes to accurately reflect the subject of the image. For example, image data 125 of subject 110 is used to generate surfaces capable of modeling the movement and actions of subject 110.

Operation 200 further includes identifying a distribution of light intensity over the at least one surface (202). In some implementations, the distribution of light intensity corresponds to a radiance associated with the surface. In 3D modeling, radiance refers to the amount of light energy emitted, reflected, or transmitted by a surface in a particular direction. It is a key property used in rendering algorithms to calculate the appearance of objects in a scene, considering factors such as surface material properties, lighting conditions, and viewing angles.

From the distribution of light intensity, operation 200 further includes identifying a view independent feature based on the distribution of light intensity (203). In some examples, the distribution of light intensity (or radiance) is mapped from the 3D space and the manifolds to the UV space. In 3D modeling, the UV space refers to a 2D coordinate system used to map textures onto the surfaces of 3D models. Each vertex of the model's geometry is assigned a corresponding UV coordinate that determines how the texture is applied to that vertex. The UV space allows for precise control over how textures are wrapped around the model's surfaces, enabling realistic rendering of details such as color, patterns, and surface properties. Here, when moved to the UV space, the computing device decomposes the UV information into view independent features and view dependent features, wherein view dependent includes lighting and texture information that is unique to specific viewpoints of subject 110.

In some examples, when converting to the UV space, the computing device performs spherical mapping. Spherical mapping from 3D space to UV space involves projecting the surface of a 3D object onto a 2D plane in a way that simulates wrapping a texture around a sphere onto a flat surface. In this process, each point on the 3D surface is associated with a corresponding point in the UV space, determining how a texture is applied to the object. The mapping may be accomplished by projecting rays from a virtual camera positioned at the center of the sphere outward onto the surface, capturing the relationship between points on the 3D object and their corresponding locations in the UV space.

Operation 200 further includes generating a texture map for a sequence of images based on the view independent feature (204). A texture map is a 2D image that is applied to the surface of a 3D model to give it visual detail and realism. The texture map contains information such as color, patterns, surface characteristics, and other visual attributes that are mapped onto the corresponding points of the 3D model's surface of subject 110. Texture maps may diffuse textures for color and basic surface detail, specular maps to control the shininess of surfaces, normal maps to simulate surface detail and lighting effects, and various other types of maps for specific visual effects. Here, by using the view independent features, the texture map captures view independent information to more efficiently be rendered on a device.

In addition to generating the texture map, the computing device may further generate a layered mesh from the surfaces (or manifolds). Layered meshes are generated from manifolds by discretizing the smooth surfaces into smaller elements and arranging them into interconnected layers. This process ensures topological consistency and enables the representation of intricate details, providing a model for rendering subject 110. When the performance of subject 110 is rendered, the texture maps may be applied to the layered mesh per frame to provide the desired display. In this example, the texture maps are created for each frame of the presentation based on the received image data to accurately reflect the original recording of the subject. The application of the texture maps per frame permits a technical solution of using a single layered mesh that is modified per frame of the presentation by the different texture maps.

Figure 3:
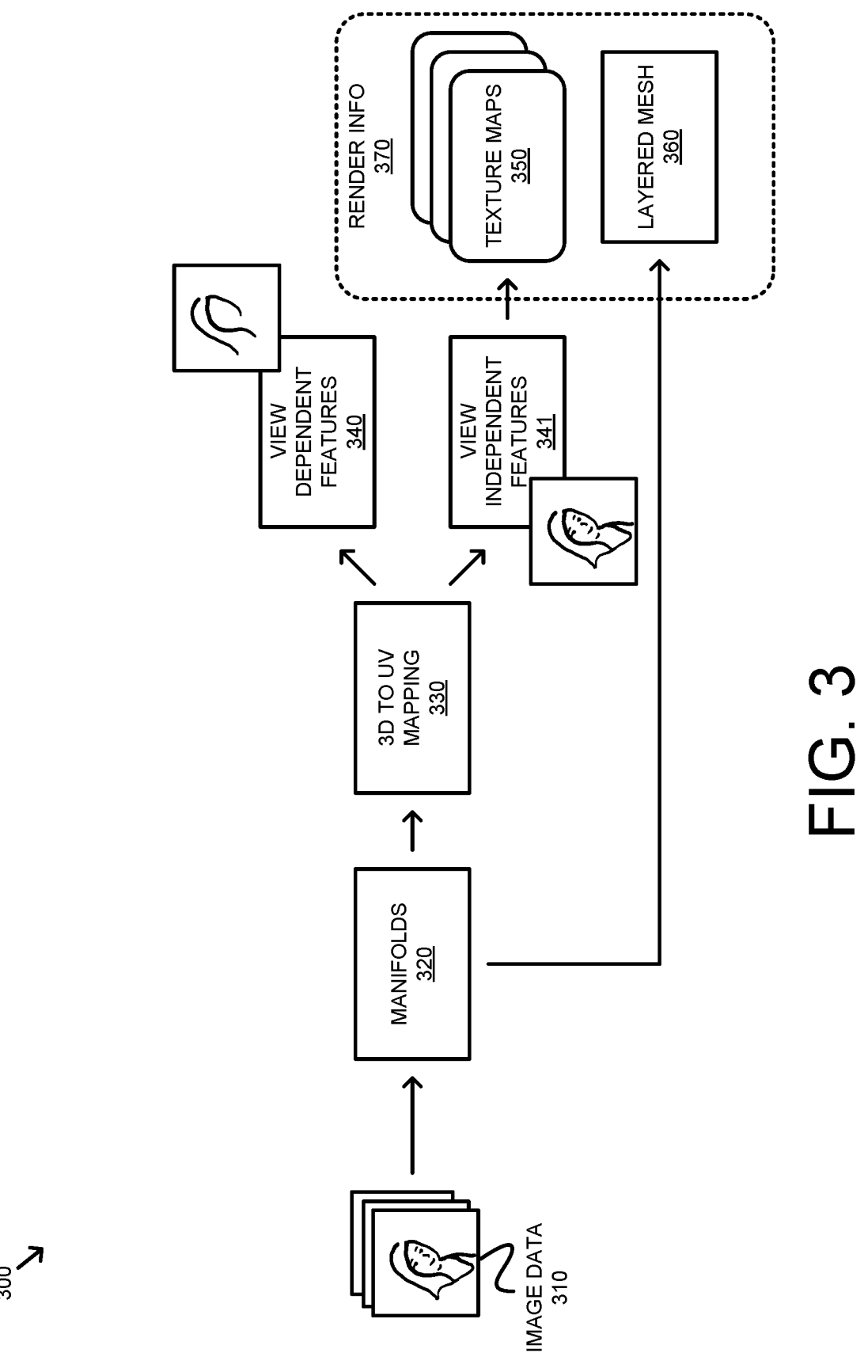
FIG. 3 illustrates an operational scenario of generating a mesh and texture maps associated with the performance of a subject.

FIG. 3 illustrates an operational scenario 300 of generating a mesh and texture maps associated with a performance by a subject. Operational scenario 300 includes image data 310, manifolds 320, 3D to UV mapping 330, view dependent features 340, view independent features 341, render information 370, texture maps 350, and layered mesh 360. Operational scenario 300 may be performed by a computing device, such as a server computing device, desktop computing device, or some other computing device.

In operational scenario 300, image data 310 is received by a computing device and manifolds 320 are generated using image data 310. Manifolds, which are representative of 2D surfaces, are generated from images through techniques like image segmentation and feature extraction, which identify regions of interest and key visual patterns. By converting these regions into geometric representations, such as surfaces or meshes, manifolds are created that capture the underlying structure and characteristics of the captured image data 310. In some implementations, manifolds 320 are generated and updated using models or neural networks that improve the manifolds representation of the captured subject (e.g., person's face). These models iteratively compare the manifolds to the captured images to determine when the manifolds accurately reflect the originally captured images.

Once manifolds 320 are generated, the computing device performs 3D to UV mapping 330 to identify view dependent features 340 and view independent features 341. 3D to UV mapping is the process of projecting the surface of a three-dimensional object onto a two-dimensional UV plane, including the radiance of the object. The view dependent features in the UV plane refer to aspects of a model's appearance or structure that change based on the viewpoint or perspective from which the model is observed. For example, a portion of hair on a person may appear differently depending on the viewpoint of the person. In contrast, view-independent features are aspects of a model's appearance or structure that remain consistent regardless of the viewpoint or perspective from which the model is observed. The dependent and independent features may correspond to the distribution of light intensity and other radiance information derived from manifolds 320. Radiance represents the brightness or intensity of light emitted or reflected from surfaces within a virtual scene, influencing the visual appearance and realism of rendered subjects.

After identifying view independent features 341, the computing device further generates texture maps 350 from view independent features 341. Texture maps 350 are 2D images applied to the surfaces of layered mesh 360 to simulate various surface characteristics such as color, roughness, and pattern. These maps define how light interacts with the model's surface, enhancing realism and detail in rendered images. Here, texture maps 350 reflect the view independent features identified in the UV space, permitting the model to reproduce the view independent features and avoid the use of the view dependent features. In some implementations, texture maps 350 are representative of red, green, blue, and alpha (RGBA) texture maps derived from at least the view independent features 341. In an RGBA texture map, each channel represents the intensity of the respective color component, and the alpha channel represents transparency. This texture map format allows for the representation of both color and transparency information of the subject that is view independent.

In addition to identifying texture maps 350, the computing device also generates layered mesh 360 using manifolds 320. Layered mesh 360 includes the features of manifolds 320. In some implementations, the manifold representation of the subject is constructed through techniques like surface reconstruction from point clouds obtained via 3D scanning or photogrammetry. Next, the manifold surface is discretized into a series of interconnected polygons, such as triangles or quadrilaterals, forming the base layer of the mesh. Additional layers are then generated by extruding, offsetting, or refining the base layer to represent different surface details or material properties. In the example of a human face, the different layers may be used to represent various aspects including eyes, mouth, or some other feature of the subject. In some implementations, manifolds 320 are generated using a model or neural network that refines and adjusts the parameters of manifolds 320 to reflect image data 310.

Once texture maps 350 and layered mesh 360 are generated, texture maps 350 and layered mesh 360 represent render information 370. Render information 370 is used by a computing device to render the 3D representation of the subject's performance. Specifically, texture maps 350 are applied to specific regions on the surface of layered mesh 360 to provide the coloring and lighting of the 3D representation for that frame.

FIG. 4 illustrates a timing diagram 400 of rendering a performance of a subject at a computing device. Timing diagram 400 includes texture maps 410, mesh 420, renderer 430, and display 440. The operations of timing diagram 400 may be employed by any computing device to render the performance of a particular subject.

In timing diagram 400, renderer 430 identifies mesh 420 representative of a layered mesh for the subject of a performance at step 1. In some implementations, mesh 420 provides a representation of a human face that was recorded as part of a video. In other implementations, mesh 420 may represent the structure of objects, animals, or some other subject of a performance. Once mesh 420 is identified, renderer 430 identifies texture information associated with a first frame from texture maps 410 at step 2. The texture information can comprise one or more RGBA texture maps that provide intensity information for the color components for the frame and the alpha channel for transparency in the frame.

At step 3, renderer 430 generates the first frame at step 3 using mesh 420 and the texture information for the first frame. In one implementation, renderer 430 uses the texture map information to provide surface details and color information to mesh 420 by mapping texture coordinates to vertices. During rendering, renderer 430 samples color information from the texture map information based on these coordinates, incorporating them into the final representation of the subject. Once rendered, the first frame is provided for display at display 440 at step 4.

Renderer 430 then repeats the steps to generate a second frame. In at least one example, the renderer 430 identifies texture information for a second frame from texture maps 410 at step 5 and generates the second frame using the texture information with mesh 420 at step 6. Once generated, the frame may be provided for display at display 440 at step 7.

Although demonstrated using two frames in timing diagram 400, similar operations may be performed by a computing device to render any number of frames for a performance of the subject. In at least one implementation, the rendering computing device may request and receive the texture maps 410 and mesh 420 from a second computing device (e.g., server). The server may identify attributes associated with the requesting device, such as hardware and/or software configurations for the device (graphics hardware, memory hardware, and the like), and select the mesh and texture maps supported by the device. Thus, while a first device is provided with first texture maps and a first layered mesh, a second device may be provided with second texture maps and a second layered mesh.

Figure 5:
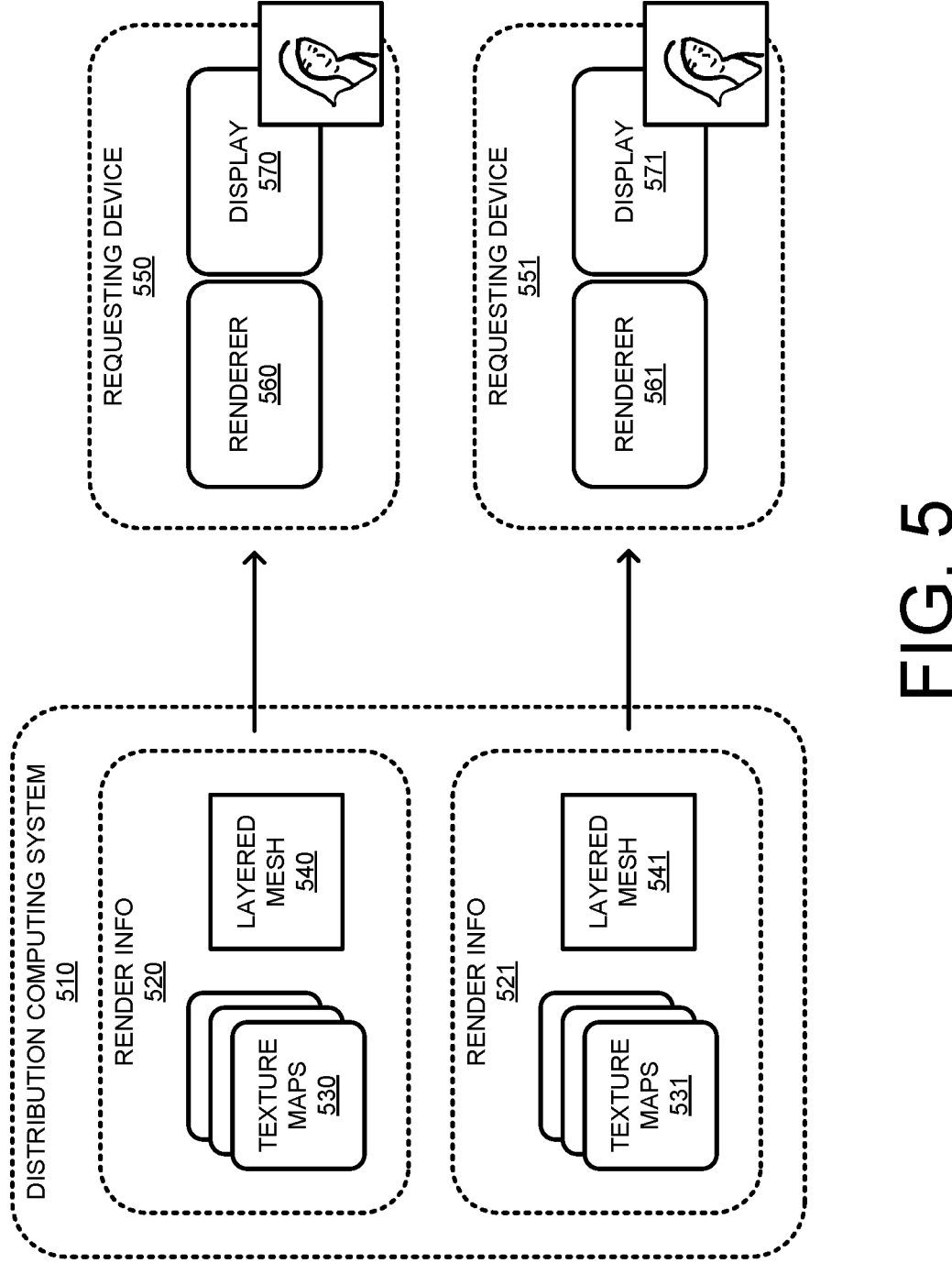
FIG. 5 illustrates an operational scenario of distributing data for a performance of a subject based on the hardware configuration of the requesting device.

FIG. 5 illustrates an operational scenario 500 of distributing data for a performance based on the hardware of the requesting device. Operational scenario 500 includes distribution computing system 510 and requesting devices 550-551. Distribution computing system 510 may be representative of one or more server computing systems, desktop computing systems, or some other computing systems capable of providing render information 520-521. Render information 520-521 include corresponding texture maps 530-531 and layered meshes 540-541. Requesting devices 550-551 further include corresponding renderers 560-561 and displays 570-571. Requesting devices 550-551 may comprise desktop computers, tablet computers, or some other device capable of rendering the performance associated with render information 520-521.

In operational scenario 500, requesting devices 550-551 request a 3D rendering associated with a performance of a subject. The performance may comprise a facial video of a person in some examples. In response to the request, distribution computing system 510 selects the requisite render information from render information 520-521. In some implementations, distribution computing system 510 identifies attributes associated with the requesting device. The attributes may include hardware information for the requesting device (available memory, graphics processing resources, device name, and the like) and may further comprise operating software or renderer type information for the device. Based on the attributes, distribution computing system 510 selects render information 520 or render information 521. Using the example, in operational scenario 500, distribution computing system 510 selects render information 520 for requesting device 550 and render information 521 for requesting device 551.

At the device renderers 560-561 use render information 520-521 to generate a render of the performance on displays 570-571. In some implementations, the renderer interprets the geometric data of the layered mesh, along with accompanying texture maps, to compute the lighting, shading, and color information for each pixel in an image, resulting in a final rendered output. The mesh provides the structure and shape of the objects in the scene, while texture maps dictate surface characteristics such as color, reflectivity, and bumpiness, enhancing the realism of the rendered image.

In some implementations, to provide different complexities associated with render information 520 and render information 521, the layered meshes may include varying quantities of layers, the texture maps may include varying resolutions, or the render information may be formatted in some other manner to support different hardware. Advantageously, by creating different render information for different devices, a technical solution of the described system uses different texture maps and layered meshes to support rendering using different hardware.

Figure 6:
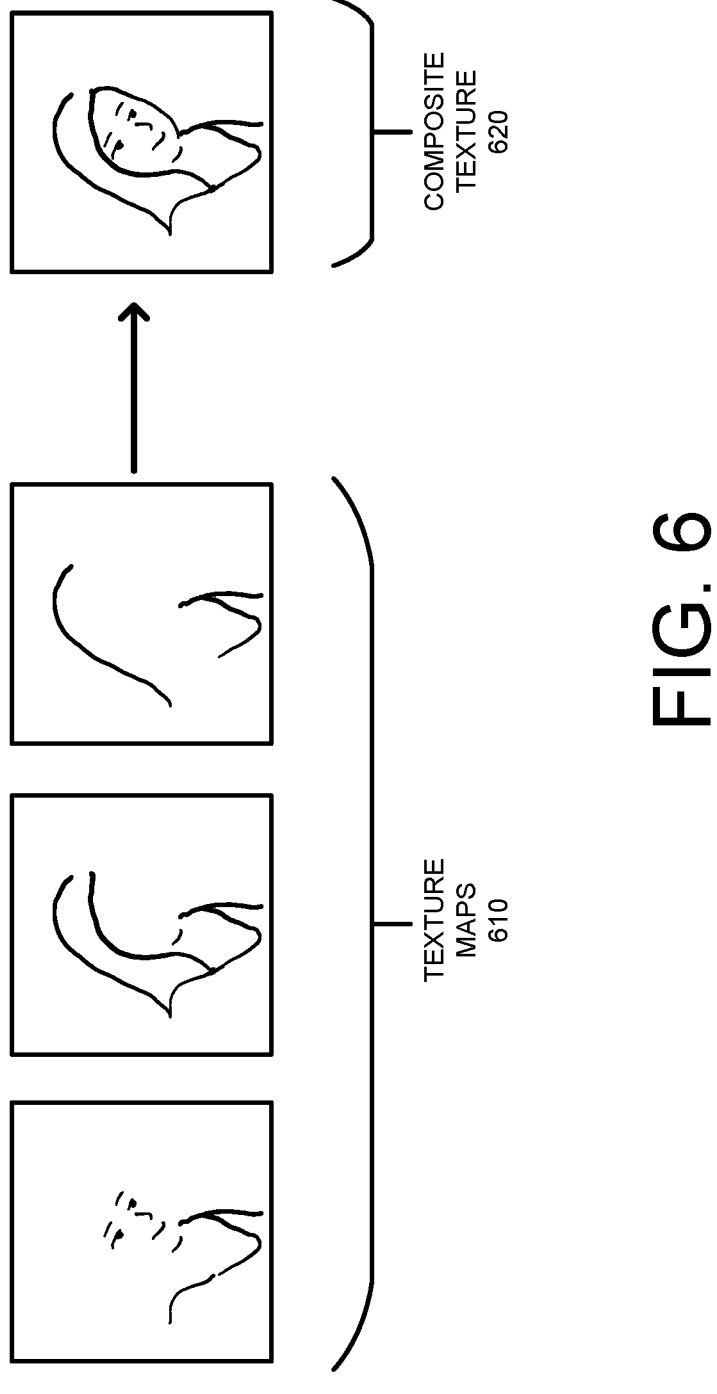
FIG. 6 illustrates an example of combining texture maps to generate a combined texture for a frame of a performance.

FIG. 6 illustrates an example 600 of combining texture maps to generate a combined texture for a frame of a performance. Example 600 includes texture maps 610 and combined texture 620. Texture maps 610 include three texture maps that are used to provide texture in association with different layers of a layered mesh. A texture map is a 2D image applied to a 3D model's surface to simulate the appearance of complex surface details such as color, roughness, or bump. In at least one implementation, texture maps 610 include RGBA texture maps that include view independent features extracted from the distribution of light intensity (or radiance) of the subject during the frame of the performance. From texture maps 610, combined texture 620 is generated that represents the subject for the frame of the 3D model performance. Texture maps are combined in a layered mesh using a technique called texture mapping or texture layering. In this process, each texture map represents a different aspect of the material's appearance, such as color, roughness, or transparency. These maps are then applied to specific areas of the 3D model's surface through UV mapping, where each vertex on the mesh is assigned coordinates that correspond to positions on the texture maps. The textured layers are blended using various methods such as alpha blending or masking, allowing for the creation of complex and realistic surface appearances with multiple texture layers interacting seamlessly across the mesh.

Although demonstrated using three texture maps in texture maps 610, a model may use any number of layers and texture maps for a model. The addition of texture maps and layers to the model may provide improved realism associated with the subject but may also increase the computational cost associated with generating the 3D render.

Figure 7:
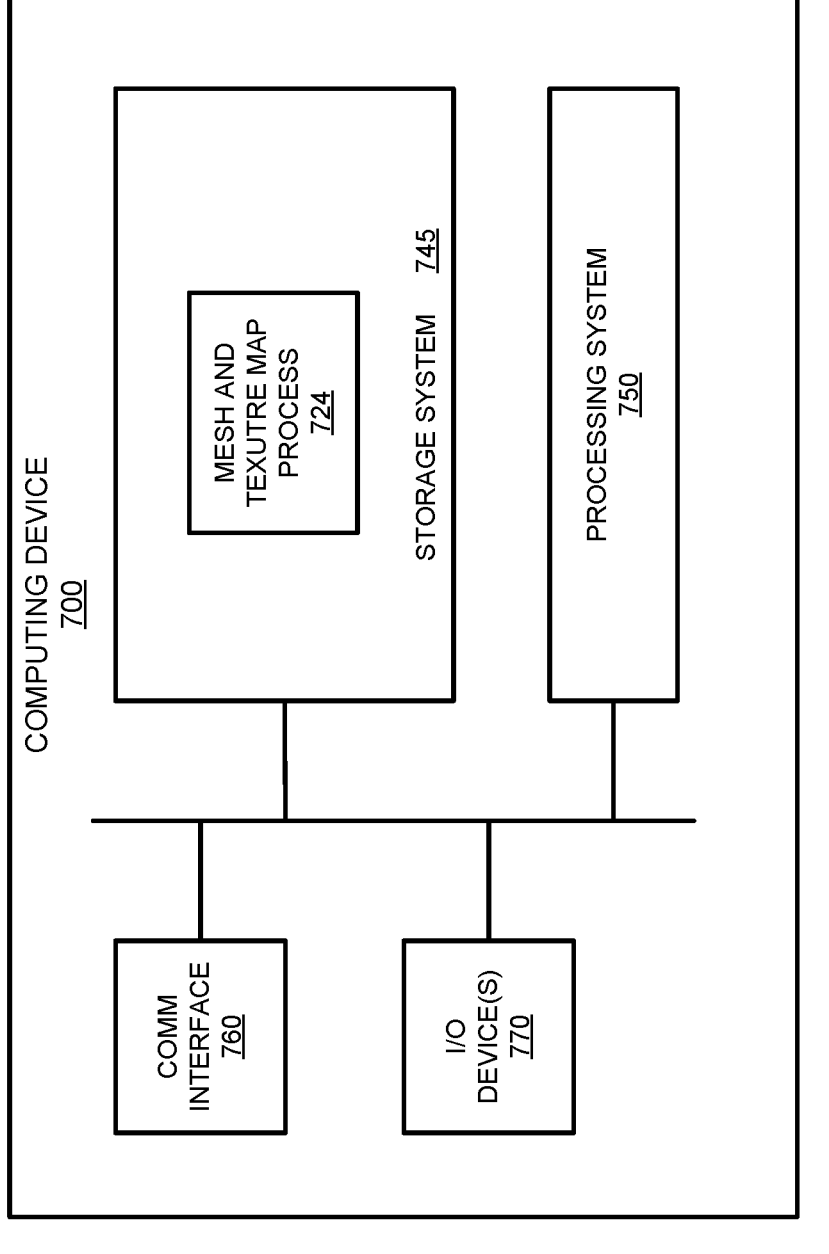
FIG. 7 illustrates a computing device to generate a mesh and a texture map associated with a performance of a subject.

FIG. 7 illustrates a computing device 700 to generate a mesh and texture map according to an example. Computing device 700 is representative of any computing system or systems with which the various operational architectures, processes, scenarios, and sequences disclosed herein for generating layered meshes and texture maps may be implemented. Computing device 700 includes storage system 745, processing system 750, communication interface 760, input/output (I/O) device(s) 770. Processing system 750 is operatively linked to communication interface 760, I/O device(s) 770, and storage system 745. Communication interface 760 and/or I/O device(s) 770 may be communicatively linked to storage system 745 in some implementations. Computing device 700 may further include other components such as a battery and enclosure that are not shown for clarity.

Communication interface 760 comprises components that communicate over communication links, such as network cards, ports, radio frequency, processing circuitry and software, or some other communication devices. Communication interface 760 may be configured to communicate over metallic, wireless, or optical links. Communication interface 760 may be configured to use Time Division Multiplex (TDM), Internet Protocol (IP), Ethernet, optical networking, wireless protocols, communication signaling, or some other communication format-including combinations thereof. Communication interface 760 may be configured to communicate with external devices, such as servers, user devices, or some other computing device.

I/O device(s) 770 may include peripherals of a computer that facilitate the interaction between the user and computing device 700. Examples of I/O device(s) 770 may include keyboards, mice, trackpads, monitors, displays, printers, cameras, microphones, external storage devices, and the like. In some implementations, I/O device(s) 770 are used to capture image data associated with a subject, wherein the subject may comprise a face, an animal, or some other object.

Processing system 750 comprises microprocessor circuitry (e.g., at least one processor) and other circuitry that retrieves and executes operating software (i.e., program instructions) from storage system 745. Storage system 745 may include volatile and nonvolatile, removable, and non-removable media implemented in any method or technology for storage of information, such as computer readable instructions, data structures, program modules, or other data. Storage system 745 may be implemented as a single storage device but may also be implemented across multiple storage devices or sub-systems. Storage system 745 may comprise additional elements, such as a controller to read operating software from the storage systems. Examples of storage media (also referred to as computer readable storage media)

include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing system 750 is typically mounted on a circuit board that may also hold the storage system. The operating software of storage system 745 comprises computer programs, firmware, or some other form of machine-readable program instructions. The operating software of storage system 745 comprises mesh and texture map process 724. The operating software on storage system 745 may further include an operating system, utilities, drivers, network interfaces, applications, or some other type of software. When read and executed by processing system 750 the operating software on storage system 745 directs computing device 700 to operate as a computing device as described herein. In at least one implementation, the operating software can provide operation 200 described in FIG. 2 as well as any other operation to generate layered meshes and texture maps.

In one example, mesh and texture map process 724 directs processing system 750 to generate at least one surface for a subject based on image data, the image data comprising a first image from a first perspective and a second image from a second perspective. In some implementations, the image data corresponds to video feeds associated with different perspectives. For example, the cameras may capture video feeds associated with different perspectives of a performance by a person. The perspectives can capture various aspects of the person's movement, facial structure, skin traits, hair traits, or some other aspect of the person's performance or speech. From the image data, at least one surface is generated that may represent a manifold for a 3D model of the subject. A manifold refers to a smooth surface that can be represented mathematically and used to construct geometric models. Each manifold identified for the subject manifold includes geometric information such as vertex positions, connectivity between vertices (edges), and the arrangement of faces forming the surface. Additionally, it may contain texture coordinates for mapping 2D textures onto the surface, along with material properties defining how light interacts with the surface for rendering.

In addition to identifying the at least one surface, mesh and texture map process 724 further directs processing system 750 to identify a distribution of light over the at least one surface. The distribution of light may be included as part of radiance values for the surfaces identified for the subject. Radiance refers to the amount of light energy emitted, reflected, or transmitted by surfaces within a virtual scene. It encompasses both the intensity and directionality of light rays, influencing the appearance and realism of rendered images. Radiance is used in rendering algorithms, as it determines how light interacts with surfaces and contributes to the final color and brightness of pixels in the rendered image. In some implementations, radiance is identified using models that attempt to make the 3D model represented by the surfaces accurately reflect the information in the originally captured images. In at least one example, the radiance and manifolds are identified using photogrammetry or some other 3D modeling operation. Photogrammetry involves capturing multiple images of a subject or performance of a subject from different viewpoints and then using specialized software to reconstruct the 3D geometry based on the visual information contained in those images or videos. The software analyzes the images to identify common features and their positions in 3D space, which are then used to generate a dense point cloud representing the surface of the object. This point cloud is subsequently processed to create a mesh, which forms the manifold representation of the object in 3D space. To better model the movement of a particular subject, computing device 700 may generate a layered mesh that represents features or materials, such as distinct aspects of a subject's face. The layered mesh may be used to better represent facial features, such as a subject's hair, mouth movement, eyes, or some other features of the subject.

Once the distribution of light intensity is identified, mesh and texture map process 724 directs processing system 750 to identify a view independent feature based on the distribution of light intensity. In some implementations, the distribution of light intensity as part of a radiance value includes features that are view dependent and view independent. For example, light may change based on the perspective of the subject. To limit the cost of rendering the view dependent features, the system filters the distribution of light intensity to identify the features that are view independent and reflect the 3D representation of the object from all perspectives.

In some implementations, computing device 700 may map the radiance information from the manifolds to the UV plane and separate the features in the UV plane into view independent features and view dependent features. First, the model of the subject represented by the at least one surface (i.e., manifold) is unwrapped onto the 2D UV plane, which serves as a template for texture mapping. This unwrapping process preserves the surface topology and ensures that each point from the surface corresponds to a unique point on the UV plane. Once the UV mapping is established, radiance features, such as texture images or material properties, are projected onto the UV coordinates. The features are then separated based on those that are applicable to all perspectives and those that are only viewable from a subset of the perspectives.

After the view independent feature is identified, mesh and texture map process 724 directs processing system 750 to generate a texture map for a sequence of images based on the view independent feature. In some implementations, a set of texture maps are generated as a movie that can be applied to the layered mesh generated from the surfaces. Each of the texture maps may correspond to a frame of the performance by the subject to update the render of the layered mesh and the subject. Thus, for a first frame a first texture map is applied to the layered mesh and for a second frame a second texture map is applied to the layered mesh.

In some implementations, rather than generating a single layered mesh and texture maps for a subject's performance, computing device 700 may generate multiple layered meshes and texture map sets that can be used in association with different rendering computing systems. For example, a first layered mesh and set of texture maps may be generated with a first complexity for a first rendering device type. Additionally, a second layered mesh and second set of texture maps may be generated with a second complexity for a second device type. The complexity may include different complexities of texture maps (e.g., size), different complexities of layers for the mesh, or some other differentiation in complexity.

Clause 1. A method comprising: generating at least one surface for a subject based on image data, the image data comprising a first image from a first perspective and a second image from a second perspective; identifying a distribution of light intensity over the at least one surface;

identifying a view independent feature based on the distribution of light intensity; and generating a texture map for a sequence of images based on the view independent feature.

Clause 2. The method of clause 1 further comprising generating a layered mesh from the at least one surface.

Clause 3. The method of clause 1, wherein the texture map comprises a Red, Green, Blue, and Alpha texture map.

Clause 4. The method of clause 1, wherein the distribution of light intensity is included as part of a radiance value.

Clause 5. The method of clause 4, wherein the radiance value further comprises a directionality across the at least one surface.

Clause 6. The method of clause 1 further comprising: generating a layered mesh from the at least one surface; and communicating the layered mesh and the texture map to a device.

Clause 7. The method of clause 6 further comprising: rendering the subject using the layered mesh and the texture map.

Clause 8. The method of clause 1, wherein the subject comprises a face of a person.

Clause 9. The method of clause 1, wherein identifying the view independent feature based on the distribution of light intensity comprises: determining a UV mapping from the distribution of light intensity; and identifying the view independent feature from the UV mapping.

Clause 10. A computer-readable storage medium storing program instructions that when executed by at least one processor cause the at least one processor to execute operations, the operations comprising: generating at least one surface for a subject based on image data, the image data comprising a first image from a first perspective and a second image from a second perspective; identifying a distribution of light intensity over the at least one surface; identifying a view independent feature based on the distribution of light intensity; and generating a texture map for a sequence of images based on the view independent feature.

Clause 11. The computer-readable storage medium of clause 10, wherein the operations further comprise generating a layered mesh from the at least one surface.

Clause 12. The computer-readable storage medium of clause 10, wherein the texture map comprises a Red, Green, Blue, and Alpha texture map.

Clause 13. The computer-readable storage medium of clause 10, wherein the distribution of light intensity is included as part of a radiance value.

Clause 14. The computer-readable storage medium of clause 13, wherein the radiance value further comprises a directionality across the at least one surface.

Clause 15. The computer-readable storage medium of clause 10, wherein the operations further comprise: generating a layered mesh from the at least one surface; and communicating the layered mesh and the texture map to a device.

Clause 16. The computer-readable storage medium of clause 10, wherein the subject comprises a face of a person.

Clause 17. An apparatus comprising: at least one processor; and a non-transitory computer-readable storage medium storing program instructions that cause the at least one processor to: generate at least one surface for a subject based on image data, the image data comprising a first image from a first perspective and a second image from a second perspective; identify a distribution of light intensity over the at least one surface; identify a view independent feature based on the distribution of light intensity; and generate a texture map for a sequence of images based on the view independent feature.

Clause 18. The apparatus of clause 17, wherein the program instructions further direct the at least one processor to generate a layered mesh from the at least one surface.

Clause 19. The apparatus of clause 17, wherein the texture map comprises a Red, Green, Blue, and Alpha texture map.

Clause 20. The apparatus of clause 17, wherein the distribution of light intensity is included as part of a radiance value.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the implementations disclosed herein unless the element is specifically described as "essential" or "critical."

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that the terminology employed herein is for the purpose of describing aspects and is not intended to be limiting. On the contrary, this patent covers all methods, apparatus and articles of manufacture fairly falling within the scope of the claims of this patent.

What is claimed is:

1. A method comprising:
   generating at least one surface for a subject based on image data, the image data comprising a first image from a first perspective and a second image from a second perspective;
   identifying a distribution of light intensity over the at least one surface based on the image data, the distribution of light intensity including a first feature that is view independent feature and a second feature that is view dependent;
   separating the first feature included in the distribution of light intensity from the second feature; and
   generating a texture map for a sequence of images based on the first feature.

2. The method of claim 1 further comprising generating a layered mesh from the at least one surface.

3. The method of claim 1, wherein the texture map comprises a Red, Green, Blue, and Alpha texture map.

4. The method of claim 1, wherein the distribution of light intensity is included as part of a radiance value.

5. The method of claim 4, wherein the radiance value further comprises a directionality across the at least one surface.

6. The method of claim 1 further comprising:

generating a layered mesh from the at least one surface; and communicating the layered mesh and the texture map to a device.

7. The method of claim 6 further comprising:

rendering the subject using the layered mesh and the texture map.

8. The method of claim 1, wherein the subject comprises a face of a person.

9. The method of claim 1, wherein separating the first feature from the second feature comprises:

determining a UV mapping from the distribution of light intensity; and separating the first feature from the second feature based on the UV mapping.

10. A computer-readable storage medium storing program instructions that when executed by at least one processor cause the at least one processor to execute operations, the operations comprising:

generating at least one surface for a subject based on image data, the image data comprising a first image from a first perspective and a second image from a second perspective;

identifying a distribution of light intensity over the at least one surface based on the image data, the distribution of light intensity including a first feature that is view independent feature and a second feature that is view dependent;

separating the first feature included in the distribution of light intensity from the second feature; and generating a texture map for a sequence of images based on the first feature.

11. The computer-readable storage medium of claim 10, wherein the operations further comprise generating a layered mesh from the at least one surface.

12. The computer-readable storage medium of claim 10, wherein the texture map comprises a Red, Green, Blue, and Alpha texture map.

13. The computer-readable storage medium of claim 10, wherein the distribution of light intensity is included as part of a radiance value.

14. The computer-readable storage medium of claim 13, wherein the radiance value further comprises a directionality across the at least one surface.

15. The computer-readable storage medium of claim 10, wherein the operations further comprise:

generating a layered mesh from the at least one surface; and communicating the layered mesh and the texture map to a device.

16. The computer-readable storage medium of claim 10, wherein the subject comprises a face of a person.

17. An apparatus comprising:

at least one processor; and a non-transitory computer-readable storage medium storing program instructions that cause the at least one processor to:

generate at least one surface for a subject based on image data, the image data comprising a first image from a first perspective and a second image from a second perspective;

identify a distribution of light intensity over the at least one surface based on the image data, the distribution of light intensity comprising a first feature that is view independent and a second feature that is view dependent;

separate the first feature included in the distribution of light intensity from the second feature; and generate a texture map for a sequence of images based on the first feature.

18. The apparatus of claim 17, wherein the program instructions further direct the at least one processor to generate a layered mesh from the at least one surface.

19. The apparatus of claim 17, wherein the texture map comprises a Red, Green, Blue, and Alpha texture map.

20. The apparatus of claim 17, wherein the distribution of light intensity is included as part of a radiance value.

* * * * *